April 1, 1969  GORO FUJIWARA ET AL  3,436,342
DISPOSAL OF WOOL RINSINGS
Filed Dec. 22, 1965

INVENTOR

ATTORNEY

3,436,342
DISPOSAL OF WOOL RINSINGS

Goro Fujiwara, Neyagawa, Takeshi Oda, Hirakata, Nobuyoshi Todo, Ibogawacho, and Yukio Yajima, Kobe, Japan, assignors to Kanematsu Woollen Mills Ltd., a corporation of Japan, and Takuma Boiler Mfg. Co., Ltd., Osaka, Japan
Filed Dec. 22, 1965, Ser. No. 516,214
Int. Cl. B01d *11/04*
U.S. Cl. 210—21          8 Claims

ABSTRACT OF THE DISCLOSURE

Method of disposing of wool rinsings in which the wool rinsings are first acidified by a mineral acid to a pH of from 3 to 4 such as to separate the waste water from sludge, the sludge is then centrifuged by a horizontal centrifugal decanter to remove additional water, and a combination solvent comprising a first solvent which is soluble in water for dissolving soap, and a second solvent which is insoluble in water for dissolving wool grease, is used to dissolve the wool grease and soap contained in the sludge with the remaining materials filtrated, and water is added to the combined solvent to separate the solvent containing the wool grease from the solvent containing the soap, then the wool grease and soap are distilled from the solvents.

---

Figure 1:
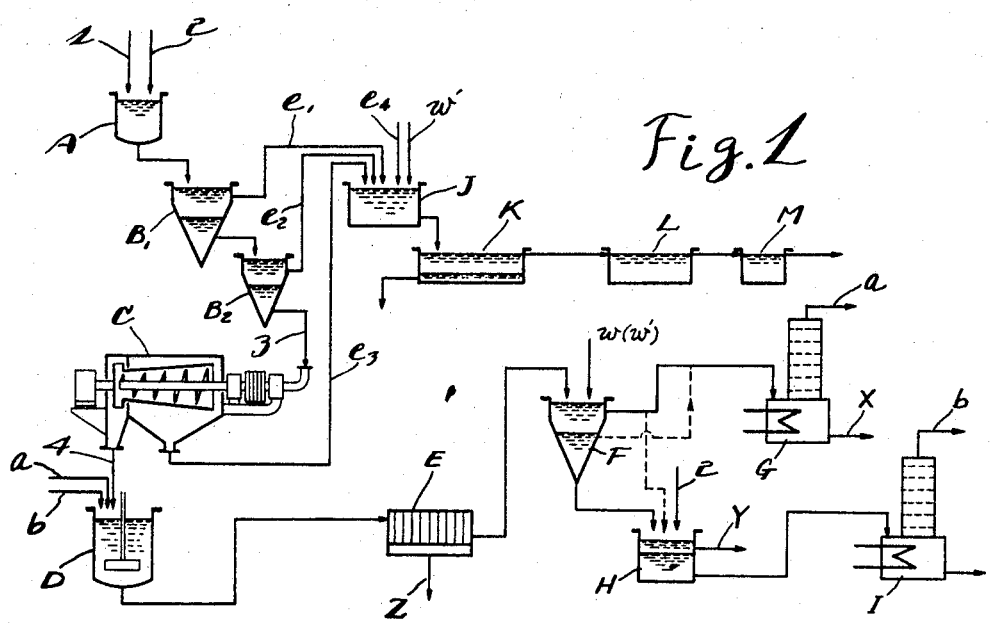

This invention relates to a method of disposing of wool rinsings, and more particularly to such a method which permits recovery of valuable byproducts and prevents pollution of drainages.

Sheared wool usually contains or is coated with such materials as wool grease, proteins, skin, soil, sand, vegetable seeds, and other foreign matter. Some of these materials, such as wool grease which may be refined into lanolin, are valuable and their recovery is desirable. In the prior art, the sheared wool was usually cleaned with soap, and the rinsings were discharged into public drainages, such as rivers, without first recovering the aforementioned foreign materials, thus polluting such drainages.

In one prior art method, a part of the wool grease is recovered by use of a centrifuge. One disadvantage to this method is that the wool grease which is in a state of complicated emulsion, is not readily separable by the addition of ordinary electrolytic salts to break down the emulsion. Attempt to separate the grease by the addition of special electrolytic salts, or by using an acid and heating the emulsion tends to cause other problems. Thus, recovery of wool grease by the centrifugal method is limited to about 15 percent of the total grease content. The remainder is usually discharged into public drainages, thus causing their pollution.

In the present invention, the emulsified rinsings are broken down into a layer of sludge and a layer of waste water by the addition of a mineral acid, such as sulfuric acid, without use of heat, until the rinsings have a pH value of from 3 to 4. The layer of waste water is removed, and further waste water is extracted from the sludge layer, by use of a horizontal centrifugal decanter, which in one embodiment had a capacity of from 2,000 to 3,000 grams. Such an equipment was used to prevent escape of oil with the water during the water extraction step, and to prevent accumulation of caky matter in the equipment.

The caky matter was then treated with a combination solvent comprising a first solvent which was water soluble and a second solvent which was water insoluble, both being soluble in each other. The first solvent was capable of dissolving soap, and the second solvent was capable of dissolving wool grease. Water added to the combined solvent causes separation of the first and second solvents. By then distilling the respective solvents, wool grease which was dissolved in the second solvent was recovered, and soap which was dissolved in the first solvent was recovered.

The other materials was recovered as fertilizer, and the waste water which was thereupon further treated and purified was then discharged, pollution free, into the public drainage.

As can be seen from the following table, the discharged waste water was sufficiently pollution free such as to not contaminate the public drainage into which the waste water was discharged.

| | Liquid | | |
|---|---|---|---|
| | 1 | 2 | 3 |
| | Original Rinsings | Waste Water added with sulfuric acid | Waste Water Neutralized |
| pH | 9 | 4 | 8 |
| Transparency, cm | 0.1 | 1.5 | 30 |
| Oil Contents, p.p.m | 16,200 | 640 | 18 |
| C.O.D., p.p.m | 1,400 | 280 | 20 |

In the table, the last column refers to waste water which was neutralized after it was separated from the layer of sludge. The neutralized waste water was purified to a satisfactory grade by an usual method, after which it had negligible oil content and about 20 p.p.m. (parts per million) of C.O.D.

Figure 2:
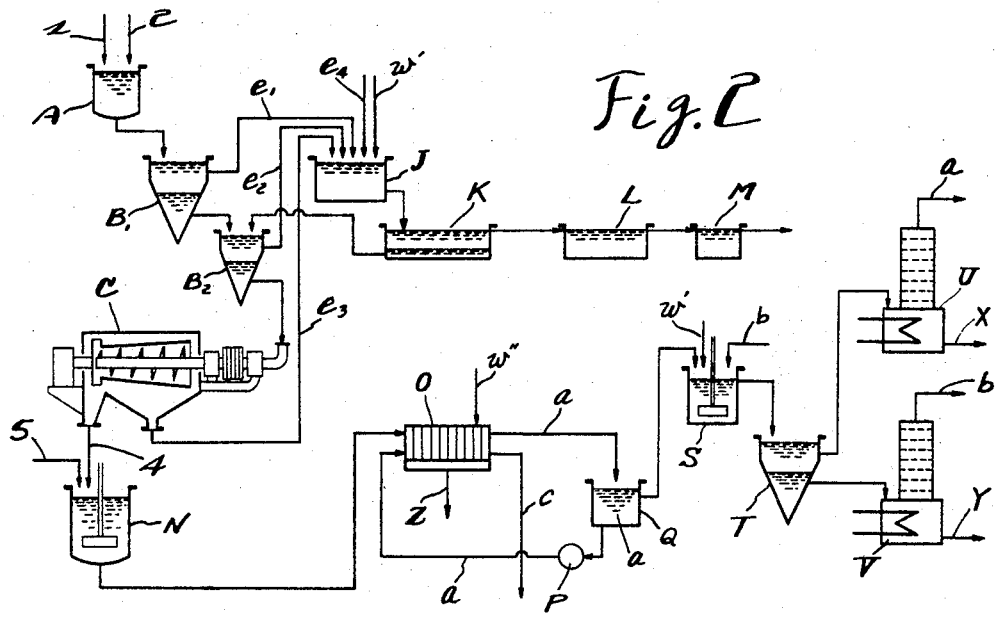

In the drawing:
FIG. 1 depicts a flow chart illustrating an embodiment of the invention, and
FIG. 2 depicts a flow chart illustrating another embodiment of the invention.

The invention will now be described in greater detail in connection with the following examples, and with reference being made to the flow chart of FIG. 1.

EXAMPLE I

In tank A, 120 liters of wool rinsings 1 containing about 1.6% wool grease is initially supplied. Then there is added a mixture of 2 of 340 grams of concentrated sulfuric acid to 1 liter of water to obtain a pH of 3 of the total liquid content. This caused separation into a layer of waste water and a layer of sludge which contained wool grease, proteins, soil and other foreign matter. Waste water $e1$ and $e2$, are removed from separating tanks B1 and B2. The residual sludge 3 is continuously treated through a horizontal centrifugal decanter C to obtain 4.2 kg. of cake 4, which contained about 30% of moisture, and waste water $e3$ is further removed. The cake 4, with or without being further dried, is mixed with about 150 grams of sodium carbonate.

The cake 4 contains wool grease, proteins, soil and soap, the latter element being produced in the neutralizing action with sodium carbonate just mentioned. In this invention, the wool grease and the soap are separated by the use of a combination solvent which comprises a first solvent in which the soap may be dissolved and which is water soluble, and a second solvent in which the wool grease may be dissolved and which is water insoluble. The other foreign matter, such as protein, soil and other materials, are insoluble in such a combination solvent, and are separated from the wool grease and soap by use of such combination solvent. For wool grease suitable solvents are cyclic or chain hydrocarbon and chlorine substituted derivatives thereof having a boiling point of below 80° C. For soap, suitable solvents are monohydric alcohols having a carbon number of two or more. The two component solvents should be soluble in each other.

The cake 4 is dissolved in a combined solvent as will be explained below, and the foreing material other than wool grease and soap are filtered out, from the combined solvent. The filtrate is a complete mixture of wool grease and soap each dissolved in its respective solvent. By the addition of sufficient water, the filtrate is separated into two layers; one containing the solvent having wool grease dissolved therein, and the other containing the solvent having soap dissolved therein. The two layers are distilled individually to obtain the wool grease and soap, with the respective solvents also being recovered.

In this particular example, the cake 4 is mixed in tank D with 10 liters of a solution comprising about 6 parts of petroleum benzine $a$ to dissolve the wool grease, and 4 parts isopropyl alcohol $b$ to dissolve the soap. The mixture is agitated at about 40° C. in tank D. Then the mixture is taken to a filter press E, from which it is delivered in liquid form having a light-brown transparent color to tank F. Proteins, soil and other foreign material are drained off as residue Z out of the filter press E. In tank F, water $w$ is added to the liquid if it is already neutralized with sodium carbonate in the previous step, and alkaline aqueous solution $w'$ is added to the liquid for neutralization, if it was not yet neutralized in the previous step. In either event, the liquid is separated into two layers when it is agitated and left to stand in tank F. The upper layer is taken to a distillation column G, where the solvent $a$ is recovered and 1.25 kg. of wool grease X with acid value of 3 and moisture percentage of 0.8% is obtained. The lower layer is taken to tank H, where it has added thereto acid 2 to separate upward from the soap 200 grams of fat content Y with acid value 120 and moisture percentage 1, while the downward contained matter is further led to a distillation column I to recover the solvent $b$.

EXAMPLE II

Into tank A, which is supplied with 120 liters of wool rinsings 1 which corresponds in grade to "liquid-1" used in the table, and containing about 1.6% wool grease, there is added sulfuric acid 2 in an amount sufficient to cause the total liquid to have a pH value about 4. There results a separation into two layers, the upper layer being of waste water, and the lower layer being of sludge, when there is mechanical agitation. When there is air agitation, the upper layer is sludge and the lower layer is waste water. Waste water $e1$ and $e2$ are taken out of separating tanks B1 and B2. The residual sludge 3 is continuously treated through a horizontal centrifugal decanter C to obtain about 3.15 kg. of cake 4, which contains about 27% moisture, and to remove waste water $e3$.

The waste waters $e1$, $e2$, $e3$, are gathered in tank J together with waste water from other lines outside of the present system. In tank J, the waste water corresponds in grade to "liquid-2" of the above table. The waste water is agitated with an alkaline solution $w'$. After being left to stand in vessel K, the liquid now corresponds in grade to "liquid-3" of the above table. It is further purified in an exposure tank L and sterilizing tank M in accordance with known methods, resulting in a final discharge of waste water having a negligible oil content and about 20 p.p.m. of C.O.D.

Cake 4 is delivered from centrifugal decanter C, and mixed in tank D with 10 liters of a solution containing 7 parts of carbon tetrachloride $a$, which dissolves the wool grease, and 3 parts of isopropyl alcohol $b$ which dissolves the soap. The mixture is then passed through a filter press E, where the residue Z is drained off. The filtrate is led to a tank F where there is added to it 2 liters of 3% caustic soda solution $w'$, and thus caused to be separated into two layers. The upper layer comprises the soap dissolved in aqueous solution of isopropyl alcohol $b$, and the lower layer comprises the wool grease dissolved in carbon tetrachloride $a$. The lower layer of tank F is taken to distillation column G to recover the tetrachloride $a$ and to obtain 1.4 kg. of wool grease X with acid value 3 and moisture content of 0.8 percent. The other layer is taken to tank H, where there is added to it acid 2 to separate upward from the soap about 200 grams of fat content Y with acid value 120 and moisture content of 1 percent. The downward positioned matter is further removed to the distillation column I to recover the solvent $b$.

In the above examples, proteins, soil and other foreign matter are separated from the combined solvent in which the wool grease and soap are dissolved, by means of a filter. It was found that proteins are difficult to separate from the combined solvent, since the solvent would tend to swell the protein. This particular difficulty was overcome by solidifying the protein prior to the dissolution of the caky matter in the combined solvent. This is illustrated in the following example, which should be referenced to FIG. 2.

EXAMPLE III

Cake 4, weight 3.5 kg. and containing about 27% moisture, is delivered into tank N from the centrifugal decanter C as described in Example II. In tank N the cake 4 is agitated with the same quantity of methanol 5 at about 40° C. The proteins in cake 4 are caused to be sufficiently solidified.

The mixture of cake 4 and methanol 5 is then taken to filter press O, where the methanol 5 is recovered. This time, however, residue Z is not drained off, but 3.5 liters of petroleum benzine $a$ is circulated into the filter press O by means of a pump P from tank Q so that the solvent $a$ carries out the wool grease. The remainder of solvent $a$ is driven out of the filter press O by the application of steam $w''$. The liquid containing wool grease is then taken to tank S, where it is agitated with about 0.7 kg. of a mixture composed of 30% isopropyl alcohol solution $b$ and 2% caustic soda solution $w'$. The liquid is separated into two layers in a tank T. The upper layer is taken to a distillation column U, where the petroleum benzine $a$ is recovered, while about 1.4 kg. of wool grease X, which was of light-brown lustre, with acidic value of 2 and moisture content of 0.8 percent was obtained. The lower layer was also taken to a distillation column V, where the isopropyl alcohol $b$ is recovered while 250 grams of fat content Y with acid value of 110 and moisture content of 1 percent are separated by the addition of acid.

What is claimed is:
1. Method of disposing of wood rinsings, comprising the steps of adding mineral acid to said wool rinsings until the pH of the resulting mixture is within the range of from 3 to 4;
  allowing the resulting mixture to separate into a layer of waste water and a layer of sludge containing substantially all of the solids of said wool rinsings,
  centrifuging said sludge with a horizontal centrifugal decanter to remove additional waste water and to form a cake containing substantially all of the solids of said sludge;
  neutralizing any soap contained in said cake;
  treating said cake with a combination solvent consisting of a first solvent soluble in water and capable of dissolving soap, and a second solvent insoluble in water and capable of dissolving wool grease, said first solvent being monohydric alcohol having at least two carbon atoms, and said second solvent being selected from the group consisting of cyclic hydrocarbon, chain hydrocarbon, and chlorine substituted derivatives thereof, with a boiling point below 80° C., said first solvent and said second solvent being mutually soluble in each other;
  filtering the resulting liquid to remove material other than said soap and said wool grease contained in said soap to obtain a fertilizer;
  adding water to the filtrate resulting from said filtering step to separate said filtrate into one part containing said first solvent having said soap dissolved therein, and another part containing said second solvent having said wool grease dissolved therein;
  distilling said second solvent thereby to separate said wool grease therefrom;

distilling said first solvent thereby to separate said soap therefrom;

neutralizing said waste water and said additional waste water;

allowing the resulting liquid to separate into supernatant and sediment;

exposing said supernatant to air;

sterilizing said exposed supernatant; and discharging the sterilized liquid into an external drainage.

2. Method of claim 1, wherein said first solvent is isopropyl alcohol.

3. Method of claim 1, wherein said second solvent is benzine.

4. Method of claim 1, wherein said second solvent is carbon tetrachloride.

5. Method of claim 1, comprising the further steps of solidifying any protein contained in said cake with methanol; filtering the resulting liquid to recover said methanol; and treating the resulting residue with said second solvent prior to the neutralizing of any soap contained in said cake; and thereafter treating the resulting liquid with said first solvent.

6. Method of claim 5 wherein said first solvent is isopropyl alcohol.

7. Method of claim 5, wherein said second solvent is benzine.

8. Method of claim 5, wherein said second solvent is carbon tetrachloride.

References Cited

UNITED STATES PATENTS

| | | | |
|---|---|---|---|
| 2,417,329 | 3/1947 | Snyder | 260—412.5 |
| 2,421,094 | 5/1947 | Totney | 260—412.5 |

FOREIGN PATENTS 126,771  2/1948  Australia.

Anon, Purification of Trade Wastes (Halifax, England), Sewage Works Journal, September 1933, vol. 5, pp. 890–891 (P.O.S.L.).

MICHAEL E. ROGERS, *Primary Examiner.*

U.S. Cl. X.R.

71—18; 203—52; 210—66; 260—412.5